United States Patent
Schat

(10) Patent No.: US 11,689,932 B2
(45) Date of Patent: Jun. 27, 2023

(54) WIRELESS COMMUNICATION DEVICE AND METHOD FOR SPYING COUNTER MEASURES

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 420 days.

(21) Appl. No.: 17/028,188

(22) Filed: Sep. 22, 2020

(65) Prior Publication Data

US 2021/0120421 A1 Apr. 22, 2021

(30) Foreign Application Priority Data

Oct. 21, 2019 (EP) .................................... 19204393

(51) Int. Cl.
  *H04W 12/12* (2021.01)
  *H04W 12/122* (2021.01)
  *H04W 12/63* (2021.01)
  *H04B 7/06* (2006.01)
  *H04W 84/12* (2009.01)

(52) U.S. Cl.
  CPC ........ *H04W 12/122* (2021.01); *H04B 7/0626* (2013.01); *H04W 12/63* (2021.01); *H04W 84/12* (2013.01)

(58) Field of Classification Search
  None
  See application file for complete search history.

(56) References Cited

U.S. PATENT DOCUMENTS

| | | | | |
|---|---|---|---|---|
| 10,732,254 | B2* | 8/2020 | Chiu | H04W 64/006 |
| 2012/0113837 | A1* | 5/2012 | Siomina | H04W 24/10 |
| | | | | 370/252 |
| 2016/0127019 | A1* | 5/2016 | Schelstraete | H04W 64/003 |
| | | | | 370/252 |
| 2020/0077272 | A1* | 3/2020 | Bahr | H04W 8/18 |

(Continued)

FOREIGN PATENT DOCUMENTS

| | | | |
|---|---|---|---|
| CN | 103308934 B | | 5/2015 |
| CN | 106803769 A | * | 6/2017 |
| CN | 107466102 A | * | 12/2017 ............ H04W 64/00 |

OTHER PUBLICATIONS

Adib, Fadel et al.; "See Through Walls With WiFi!;" SIGCOMM '13: Proceedings of the ACM SIGCOMM 2013 Conference on SIGCOMM; Aug. 2013, Hong Kong, China; https://doi.org/10.1145/2486001.2486039.

(Continued)

*Primary Examiner* — Richard A McCoy

(57) ABSTRACT

A wireless communication device is described that comprises: a receiver configured to receive wireless local area signals located within a closed area; and a processor configured to: process the received wireless local area signals; calculate a standard deviation, STD, of Amplitude Channel State Information, A CSI, of the received wireless local area signals and, in response thereto, generate at least one transmit wireless local area signal based on the calculated A CSI STD values. A transmitter is coupled to the processor and configured to transmit the at least one transmit wireless local area signal within the closed area to disrupt an attacker located adjacent the closed area from determining a location or movement of at least one of: a moving person, the at least one further wireless communication device within the closed area.

15 Claims, 5 Drawing Sheets

(56) References Cited

U.S. PATENT DOCUMENTS

| | | | |
|---|---|---|---|
| 2020/0120509 A1* | 4/2020 | Stitt | H04W 12/122 |
| 2020/0167409 A1* | 5/2020 | Wei | G06F 17/16 |
| 2020/0186968 A1* | 6/2020 | Kondo | H04W 64/00 |
| 2020/0322805 A1* | 10/2020 | Wang | H04W 88/10 |
| 2021/0019433 A1* | 1/2021 | Finkenzeller | G01S 11/06 |
| 2021/0084499 A1* | 3/2021 | Kuchler | G01S 7/415 |

OTHER PUBLICATIONS

Chetty, Kevin et al.; "Through-the-Wall Sensing of Personnel Using Passive Bistatic WiFi Radar at Standoff Distances;" Published in IEEE Transactions on Geoscience and Remote Sensing; vol. 50, Issue 4; Apr. 2012; Date of Publication Sep. 15, 2011; DOI: 10.1109/TGRS.2011.2164411.

MAC Spoofing; Retrieved from the Internet—Wikipedia, Sep. 21, 2020; Page was last edited Feb. 2, 2020.

Qiao, Yue et al.; "PhyCloak: Obfuscating Sensing From Communication Signals;" NSDI'16: Proceedings of the 13th Usenix Conference on Networked Systems Design and Implementation; Mar. 16-18, 2016, Santa Clara, California.

Vakalis, Stavros et al.; "Imaging With WiFi;" Published in IEEE Access, vol. 7; Received Feb. 8, 2019, Accepted Feb. 22, 2019, Date of Publication Feb. 28, 2019, Date of Current Version Mar. 18, 2019; DOI: 10.1109/ACCESS.2019.2902315.

Wang, Xuyu et al.; "CSI-Based Fingerprinting for Indoor Localization: A Deep Learning Approach;" IEEE Transactions on Vehicular Technology; vol. 66, Issue 1, Jan. 2017; DOI: 10.1109/TVT.2016.2545523.

Wang, Yan et al.; "E-eyes: Device-free Location-oriented Activity Identification Using Fine-grained WiFi Signatures;" MobiCom '14, Proceedings of the 20th Annual International Conference on Mobile Computing and Networking; Sep. 7-11, 2014, Maui, Hawaii; https://doi.org/10.1145/2639108.2639143.

Yu, Hongli et al.; "A Passive Localization Scheme Based on Channel State Information in an Indoor Environment;" 2017 31st International Conference on Advanced Information Networking and Applications Workshops; Mar. 27-29, 2017, Taipei, Taiwan; DOI: 10.1109/WAINA.2017.85.

Zhu, Yanzi et al.; "Adversarial WiFi Sensing using a Single Smartphone;" arXiv:1810.10109v2; Nov. 20, 2018.

Zhu, Yanzi et al.; "Et Tu Alexa? When Commodity WiFi Devices Turn into Adversarial Motion Sensors;" arXiv.org > cs > arXiv:1810.10109; Submitted Oct. 23, 2018, Last Revised Jan. 11, 2020; Network and Distributed Systems Security (NDSS) Symposium 2020; Feb. 23-26, 2020, San Diego, California.

Zhu, Yanzi et al.; "Practical Mobile Sensing of the Environment;" UC Santa Barbara Electronic Theses and Dissertations; Sep. 2019.

IEEE 802.11-2016; IEEE Standard for Information technology—Telecommunications and information exchange between systems Local and metropolitan area networks—Specific requirements—Part 11: Wireless LAN Medium Access Control (MAC) and Physical Layer (PHY) Specifications; Published Dec. 14, 2016; DOI: 10.1109/IEEESTD.2016.7786995.

* cited by examiner

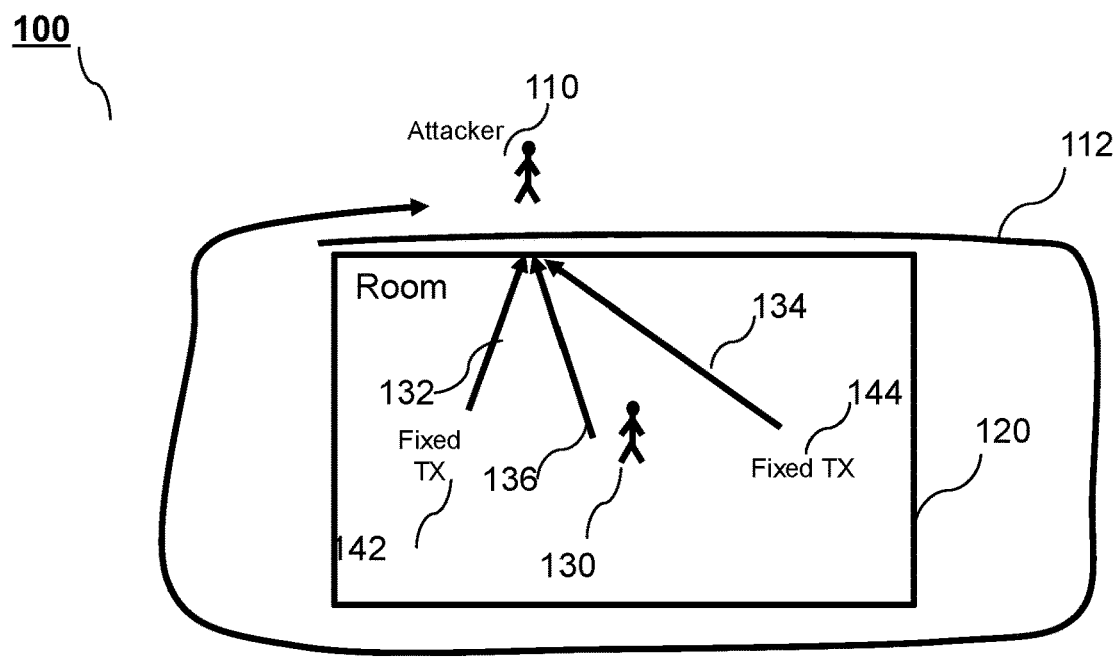
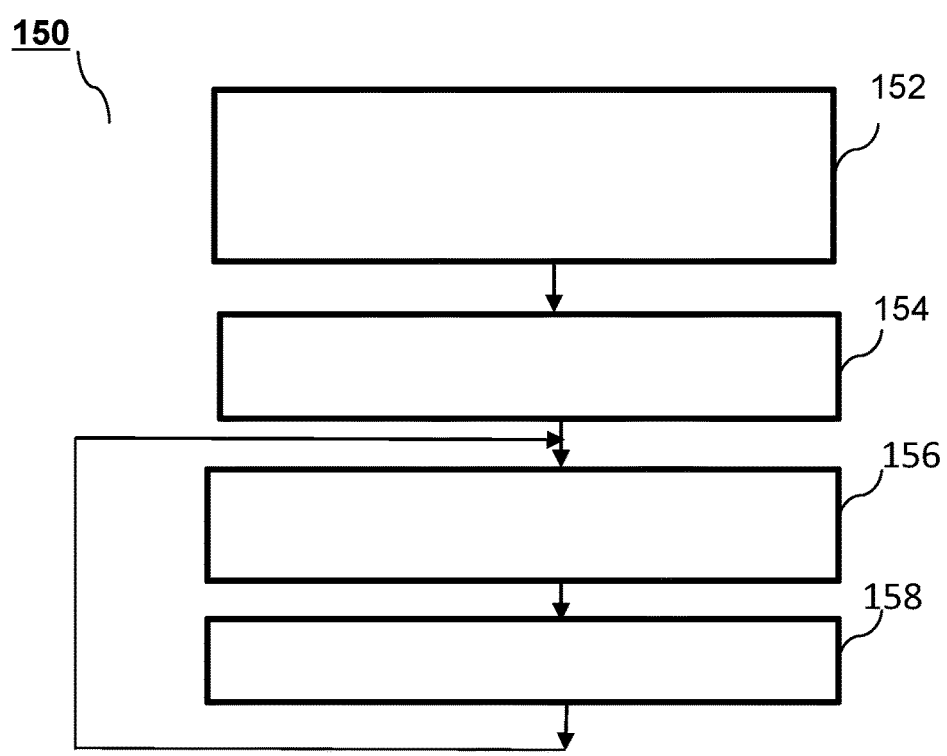
FIG. 1 – Prior Art

Table1: Stable / variable transmit pattern of virtual devices with different MAC addresses

WIRELESS COMMUNICATION DEVICE AND METHOD FOR SPYING COUNTER MEASURES

CROSS-REFERENCE TO RELATED APPLICATIONS

This application claims priority under 35 U.S.C. § 119 to European Patent Application No. 19204393.3, filed on Oct. 21, 2019, the contents of which are incorporated by reference herein.

DESCRIPTION

Field of the Invention

The field of the invention relates to a wireless communication device and a method for implementing counter-measures to defy attackers spying on other communication devices using a device. The field of the invention is applicable to, but not limited to, adaptive counter-measures to defy WLAN-assisted spying into closed rooms.

Background of the Invention

It is envisaged that the growing penetration of Internet of Things (I) devices, higher frequencies, higher compute power in smartphones and more sophisticated software may increase the risks of unobtrusive spying of people and devices. For example, it is known that Wireless Local Area Network (WLAN)—assisted spying accesses and processes signals that are emitted by WLAN routers, laptops, as well as IoT devices, in order to spy on and determine a location of the WLAN devices. Recent publications have shown that 'attackers' are capable of capturing these signals outside of closed rooms, in order to precisely identify movement of people located within these rooms. Unfortunately, these attacks require no more hardware than a commercial smartphone, in order for the attacker to be able to locate people within the room. Furthermore, such attacks don't require modifying or hacking an identifier (ID) of any of the WLAN devices located within the rooms, in order to spy on them. Additionally, such attacks don't require use of any further transmitting device, which could reveal the presence of an attack.

FIG. 1 illustrates a known diagram 100 and flowchart 150 of a known process of WLAN-assisted spying discussed in the document: 'Adversarial WiFi Sensing using a Single Smartphone, Yanzi Zhu et. al.', from: https://arxiv.org/pdf/1810.10109.pdf. This document describes the way that WLAN spying can be performed, and describes some counter-measures that were seen by the authors as insufficient. The diagram and flowchart of a known process includes a room 120 with two fixed WLAN transmitters ("Tx") 142, 144 (e.g. a WLAN router and a personal computer (PC)). Within the room 120, there is also a mobile WLAN transmitter ("Tx") 130 (e.g. a smartphone). The attacker 110 is equipped with a smartphone and initially takes a "bootstrapping" walk 112 around the room 120 in order to measure the signal strengths 132, 134, 136 of each WLAN transmitter 142, 144, 130 at several locations of this bootstrapping walk, in order to estimate the locations of each of the WLAN devices.

In the flowchart 150, after collecting various signal strength measurements for all WLAN transmitters 142, 144, 130 (according to their media access control (MAC address) at 152, whilst the attacker 110 is taking the bootstrapping walk outside of the room 120, the attacker can then create a table of identified stationary WLAN devices, with MAC address and location information, at 154. These signal strength measurement values obtained from different locations are used around the room to provide an estimate for the location of the respective WLAN device within the room. They are also used to decide whether (or not) the device is stationary or mobile (as in the case of smartphone 130). At 156, and based on the stationary WLAN devices in the list, the attacker 110 can capture WLAN signals with MAC address and Amplitude Channel State Information (A CSI) and create a map of moving people at 158. Here, it is envisaged that the term stationary encompasses a small movement of the device, such that it appears substantially stationary to an attacker. The A CSI, i.e. the amplitude of each of the spectral lines used for data transfer, is an item of information that is used by a mechanism for identifying people's movements inside a room.

This document identifies that a standard deviation (STD) of the A CSI can be continuously captured and read out by standard smartphones, even if the smartphone is in a listen-only mode, hence allowing the smartphone software to precisely conclude in-room movements from A CSI STD information. The A CSI STD, is very sensitive to reflecting entities, such as moving people, between WLAN transmitters (inside the room) and the receiver, e.g. the attacker's smartphone. The A CSI STD is even influenced by reflecting entities that are not in the direct path between transmitter and receiver, but standing nearer to, or further away, from this path.

Compared to other approaches, which require special transmitters and/or receivers, the approach described above is achievable by unskilled people, requiring no dedicated hardware and no dedicated knowledge. The likelihood of detection is very small. This brings spying of closed rooms into the reach of ordinary criminals, let alone curious neighbours, school children, etc. These risks impact both privacy, as well as impact security-related rooms in companies, Government institutions, etc. It is envisaged that such Corporate entities and their insurance policies might, in the future, mandate suitable counter-measures. Some counter-measures are described in the literature. However, the authors of this literature acknowledge the limitations, shortcomings and restrictions of the described counter-measures and an improved approach to providing such counter-measures to defy spying is both desired and needed.

SUMMARY OF THE INVENTION

The present invention provides a wireless communication device and a method therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified known example schematic diagram and flowchart of an attacker and WLAN spying situation.

DETAILED DESCRIPTION

Figure 2:
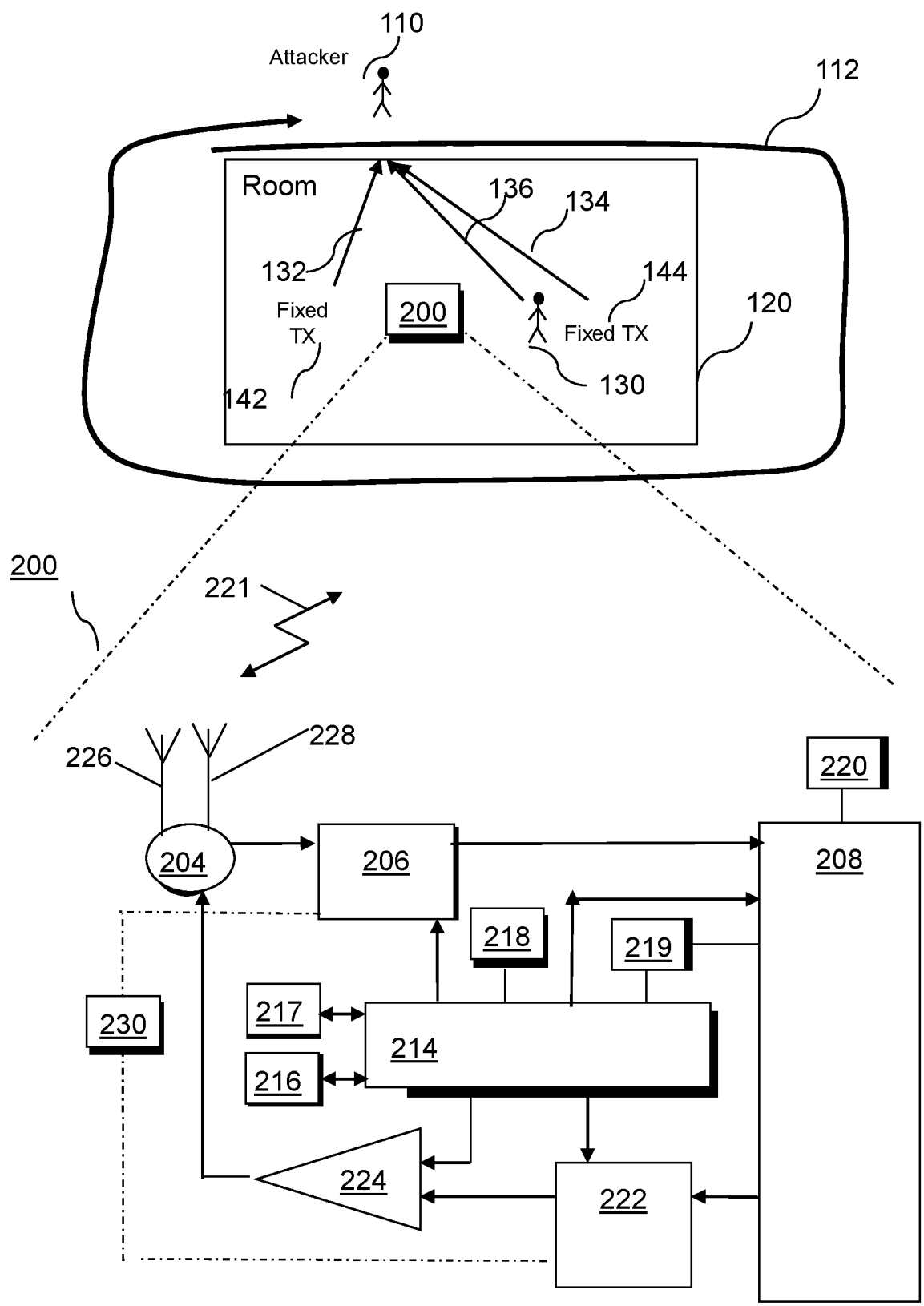
FIG. 2 illustrates a block diagram of wireless communication device, adapted in accordance with some example embodiments of the invention.

In order to address the limitations, shortcomings and restrictions of the known counter-measures to WLAN-assisted spying, examples of the invention describe a wireless communication device and method whereby signals from WLAN devices (direct as well as reflected) are captured within a closed area, such as inside a room. Appropriate signals are calculated in order to defy an attacker and these signals are transmitted within the closed area to disrupt the attacker's spying. In some examples, these signal transmissions may be assisted by creating virtual WLAN devices that exhibit alternatingly stable and/or varying behaviour.

Examples of the present invention provide a wireless communication device that includes a receiver configured to receive wireless local area signals transmit within a closed area; a processor coupled to the receiver and configured to: process the received wireless local area signals; calculate a standard deviation, STD, of Amplitude Channel State Information, A CSI, of the received wireless local area signals and, in response thereto, generate at least one signal to transmit in the closed area, where the generated at least one signal is based on the calculated A CSI STD. A transmitter is coupled to the processor and configured to transmit the generated at least one signal within the closed area that disrupts an attacker that is located adjacent the closed area from determining a location and any (physical) movement of any moving people or other wireless communication devices located within the closed area. In this manner, an attacker intent on spying in a closed area, e.g. a classified or private room, encounters significant difficulties in spying in the area. Advantageously, the claimed wireless communication device does not simply add 'noise' to the ensemble of transmitted signals, e.g. WLAN signals, say, by transmitting a large number of meaningless data packets, but may transmit dedicated (and in some instances irregular background) jamming signals. Hence, oven an attacker that is able to average out such noise, and then still obtain the desired information, is prevented or restricted from accessing such information when the claimed wireless communication device is employed.

Examples of the invention describe a wireless communication device that includes a receiver configured to receive wireless local area signals from at least one further wireless communication device located within a closed area; a processor configured to: process the received wireless local area signals; calculate standard deviation, STD, of Amplitude Channel State Information, A CSI, values of the received wireless local area signals and, in response thereto, generate at least one transmit wireless local area signal based on the calculated A CSI STD values; and a transmitter coupled to the processor and configured to transmit the at least one transmit wireless local area signal within the closed area to disrupt an attacker located adjacent the closed area from determining a location or movement of at least one of: a moving person, the at least one further wireless communication device, within the closed area.

In some examples, the processor may determine a location and any movement of at least one of: a moving person, a further wireless communication device within the closed area associated with the received wireless local area signals based on the calculated A CSI STD values and generates the at least one transmit wireless local area signal according to whether the determination of the received wireless local area signals indicates a mobile transmitting device or a substantially stationary transmitting device. In some examples, there may be signals received from several transmitters, and these A CSI STD values are captured over a certain time period. Hence, in some examples of the invention, it may be beneficial for the processor to create virtual devices that transmit stable signals during a bootstrapping walk (in order to be not excluded by the attacker as a "mobile WLAN device"). Thereafter, in order to counter-act the spying, some examples of the invention may then configure the processor to create these 'virtual' devices to transmit variable signals, in order to impersonate a 'mobile' device.

In some examples, the wireless communication device may include a controller operably coupled to at least one of: at least one variable gain amplifier to modify an amplitude of the at least one transmit wireless local area signal, at least one phase shifter to modify a phase of the at least one transmit wireless local area signal. In some examples, the at least one transmit wireless local area signal may use a plurality of subcarriers and the controller may modify a signal amplitude of each of the plurality of subcarriers in a varying manner. Thus, the wireless communication device may be able to improve the disturbance capability of the wireless communication device by modifying the amplitude of one or more of the transmit subcarriers, say on-the-fly. In this manner, the wireless communication device may increase the A CSI STD seen by the attacker by modifying the amplitude of one or more of the transmit subcarriers in a varying manner.

In some examples, the processor may generate the at least one transmit wireless local area signal to exhibit an alternating characteristic, where the alternating characteristic comprises a representation of a stable behaviour of a further wireless communication device within the closed area for a first period of time and a variable behaviour of the further wireless communication device within the closed area for a second period of time. In this manner, at least some transmissions from the wireless communication device, e.g. impersonating a transmission from virtual devices, will be seen in their "stable phase" during a bootstrapping walk from an attacker, and hence those virtual devices will be included in the list of devices from which the signals are used by the attacker to calculate one or more person's movements within the area/room.

In some examples, the transmitter may be coupled to a plurality of antennas or an array of antennas and the processor may be configured to generate a plurality of signals that mimic an operation of a plurality of further wireless communication devices, each of the plurality of signals having a different media access control, MAC, address. In some examples, the processor and the transmitter may be coupled to a plurality of transmit directional antennas that varies a directivity of a transmit pulse, and the processor and the receiver may be coupled to a plurality of receive directional antennas to obtain high angular resolution of received reflection signals within the closed area.

In some examples, the processor, receiver and transmitter may be configured to perform periodic scans for reflection properties of the closed area using a transmit pulse and a received reflection signal technique. In this manner, the wireless communication device 200 may be able to continuously update its map of the closed area (e.g. room), using a transmit pulse and receive reflection arrangement, to disturb an attacker who subsequently arrived outside of the closed room.

In some examples, the at least one transmit wireless local area signal may comprise transmit data packets configured to elicit a response from the at least one further wireless communication device located in the closed area. In this manner, these answering messages may create additional signals at the attacker's location to disturb any spying of wireless communication devices in the closed room.

In some examples, the generated at least one signal is used by the processor to overlay existing transmitted signals by at least one further communication device in the closed area to ensure that the A CSI STD value is consistently high and exhibits a homogeneous signal characteristic over location within the closed area and across time. Thus, the effect of the homogenous signal overlaying may be that the attacker considers the area as a 'room without moving people'. In this manner, the attacker may mistakenly be lead to conclude that no person is moving in the closed area (room).

In some examples, the generated at least one signal may be used by the processor to mimic a person moving within the closed area. A moving person will reflect the signals transmitted by the wireless communication devices having a high repetition rate. In this manner, it may be better to mimic a person (rather than a device) in order to encourage an attacker to believe that people are moving in the room.

In some examples, the generated at least one signal may be used by the processor to combine multiple transmit wireless local area signals to indicate to an attacker unreliable movements of at least one of: a moving person, the further wireless communication device within the closed area. For example, the processor of the wireless communication device may be configured to arrange its transmissions to create an A CSI STD value that is very high in some sub-channels, but an A CSI STD value that is very low in other sub-channels. A situation that did not include the described counter-measures may be classified as unreliable by the attacker's software. In this context, the term 'unreliable' encompasses any activity that could lead to the attacker's software doubting the accuracy of the measurement, e.g. 'inconsistent' movements, impossible movements such as a person displacing themselves by 5 meters in 1 second, for example, etc.

In some examples, the generated at least one signal may be used by the processor to combine signals to identify a plurality of different locations to an attacker that are suitable to perform spying of the closed room. Again, a situation that did not include the described counter-measured may be classified as unreliable by the attacker's software.

In some examples, the wireless communication device may further include a memory operably coupled to the receiver and the processor and configured to store calculated A CSI STD values of the received wireless local area signals and the processor may be configured to access the calculated A CSI STD values from memory to generate an image of moving further communication devices within the closed area. In some examples, the received wireless local area signals may be wireless local area network, WLAN, signals.

In a second aspect of the invention, a method for a wireless communication device includes receiving wireless local area signals within a closed area; processing the receive wireless local area signals; calculating a standard deviation, STD, of Amplitude Channel State Information, A CSI, of the received wireless local area signals and, in response thereto, generating at least one signal to transmit in the closed area where the generated signal is based on the calculated A CSI STD; and transmitting the at least one signal within the closed area to disrupt an attacker located adjacent the closed area from determining a location and any movement of at least one of: a moving person, any other wireless communication device(s) located within the closed area.

Although examples of the invention are described with respect to defying wireless local area network (WLAN) assisted spying, it is envisaged that the concepts of received wireless local area signals and transmitted disturbing wireless signals may be applied to other wireless technologies used for Internet access, such as a network of ad-hoc peer-to-peer connections, or other such local wireless network, for example ad-hoc Bluetooth$^{(RTM)}$ peer-to-peer connections.

Referring first to FIG. 2, an example of a simplified block diagram of a wireless communication device 200 is illustrated, where the wireless communication device 200 has been adapted according to example embodiments of the invention. The wireless communication device 200 comprises a receiver and a transmitter, shown as distinct circuits and paths. The wireless communication device 200 comprises a transmit antenna 226 (or an array of transmit antennas) and a receive antenna 228 (or an array of receive antennas) both operably coupled to an isolation component or circuit or an antenna switch 204 that isolates signals between the transmitter and receiver circuits.

One or more receiver chains include(s) receiver front-end circuitry 206 (effectively providing reception, low-noise amplification, filtering and intermediate or base-band frequency conversion). In example embodiments, the receiver receives a radio frequency, RF, signal and converts the received RF signal to a baseband or digital received signal. The receiver front end circuit 206, for example, may comprise a low noise amplifier (LNA) coupled to one or more frequency down-conversion mixer(s). The frequency down-conversion mixer(s) mix the amplified signal from the LNA with local oscillator signals received from local oscillator 230 and output the frequency down-converted signals to, say, low pass filter(s) (LPFs) (not shown).

The wireless communication device 200 comprises one or more signal processor(s) 208, which may be of the form of a digital signal processor (DSP). In this example, the signal processor 208 is coupled to a controller 214 that maintains overall operational control of the wireless communication device 200. The controller 214 is also coupled to the receiver front-end circuitry 206. In some examples, the controller 214 is also coupled to a buffer 217 and a memory device 216 that selectively stores operating regimes, such as decoding/encoding functions, synchronization patterns, etc. In accordance with example embodiments of the invention, the memory device 216 may also store a table of medium access control (MAC) layer addresses associated with nearby devices as well as data relating to signals received within the room, and/or spying signal transmissions that the wireless communication device 200 may have emitted, etc. A timer 218 is operably coupled to the controller 214 to control the timing of operations (e.g. transmission or reception of time-dependent signals) within the wireless communication device 200.

As regards the transmit chain, this includes an input circuit or interface 220, and transmitter/modulation circuitry 222 and a power amplifier 224 coupled to the transmit antenna 226 (or an array of transmit antennas). The transmitter/modulation circuitry 222 and the power amplifier 224 are operationally responsive to the controller 214. The signal processor 208 in the transmit chain may be implemented as distinct from a signal processor in the receive chain. Alternatively, a single processor may be used to implement a processing of both transmit and receive signals, as shown in FIG. 2.

In accordance with examples of the invention, the processor 208 and receiver front-end circuit 206 of the wireless communication device 200 are configured to continuously scan for wireless signals, such as WLAN signals within an area, e.g. in room 120. In this manner, the wireless communication device 200 is configured to receive the same WLAN signals within the room 120 that an attacker would see, in order to obtain a similar image/map to what the attacker sees. Thus, the processor 208 is configured to emulate, to some degree, the operation of an attacker, in that it obtains the A CSI (Amplitude Channel State Information, i.e. the amplitude of each of the spectral lines used for data transfer), in order to identify people's movements inside a closed area, such as a room.

Figure 3:
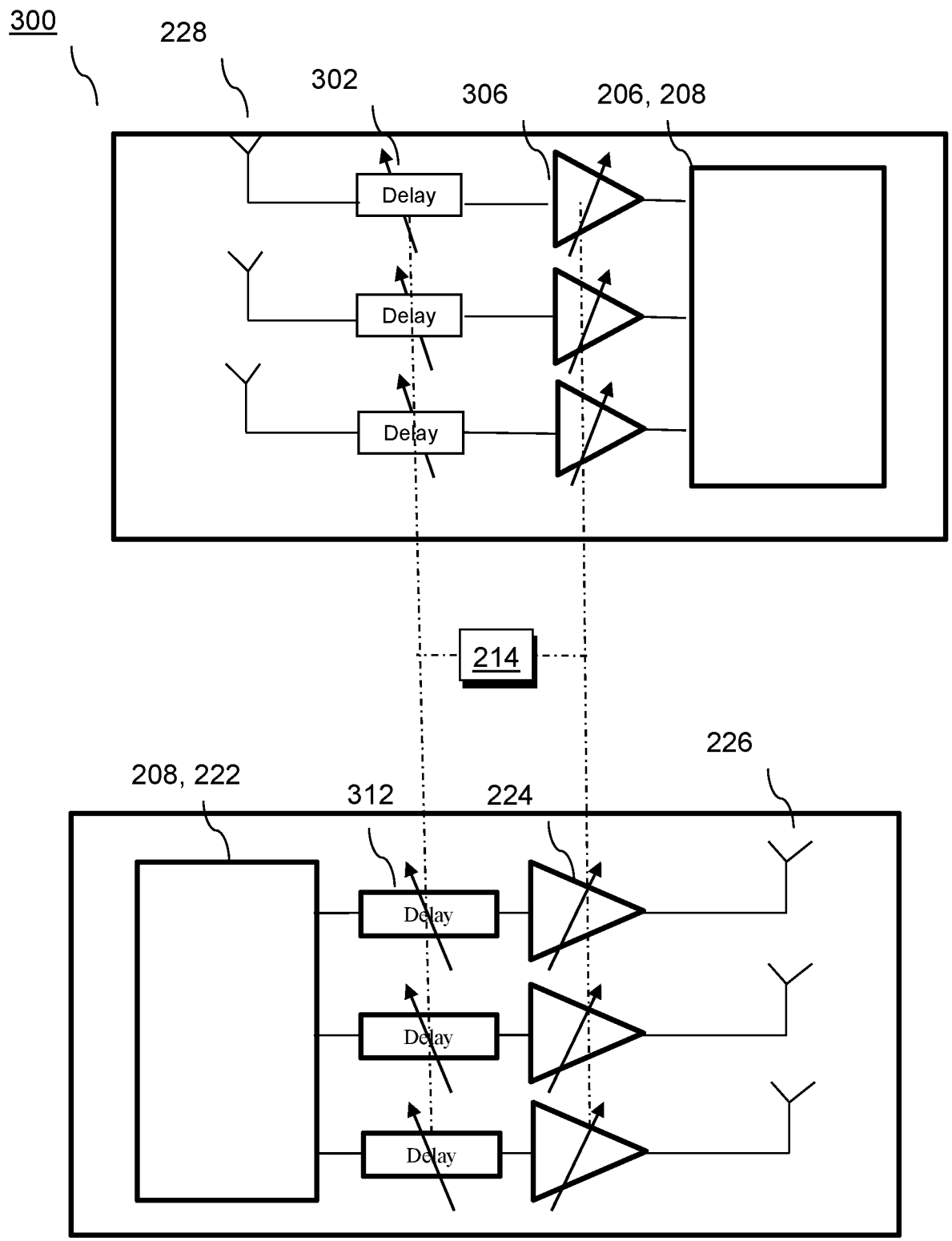
FIG. 3 illustrates an example of the wireless communication device with a receiver and/or transmitter setup using multiple antennas or an antenna array, to achieve high angular directivity and/or for high angular resolution, in accordance with some example embodiments of the invention.

In accordance with examples of the invention, the processor 208 is configured to then calculate suitable signals to counter-act/disturb any potential spying, and together with the transmitter/modulation circuitry 222 of the wireless communication device 200 are configured to transmit one or more 'counter-signals' to those identified WLAN signals. In this manner, the one or more 'counter-signals' are transmit in order to disturb any potential outside attacker 110. Advantageously, the WLAN devices inside the room 120 react only on signals using a correct MAC address. Moreover, in some examples of the invention, as shown in FIG. 3, the wireless communication device 200 is intended to have directional transmit antennas, so that a larger part of the transmit RF energy is directed towards the attacker, and only a relatively smaller amount of RF energy reaches the in-room IoT devices, which may cause very little disturbance as the MAC address do not match. In this regard, examples of the invention encompass the wireless communication device 200 being configured to iteratively (e.g. in a manner of a clock's second hand) transmit counter-signals to all potential locations (outside of the room) in order to disturb an attacker.

In accordance with examples of the invention, the wireless communication device 200 (e.g. WLAN device) can be placed anywhere in the room 120. In accordance with some examples of the invention, the wireless communication device 200 may be configured to mimic the operation of one or several WLAN devices, each having a different MAC address, e.g. impersonate a number of 'virtual WLAN devices'. In some examples, this operation may be configured by the processor 208, whereby each transmission created to impersonate a virtual WLAN device may use a different MAC address.

Thereafter, the attacker will, during a bootstrapping walk, use the WLAN signals of each (virtual) device to decide, for each (virtual) device, whether it shall be considered as a stationary device or a mobile device. Hence, in some examples of the invention, it may be beneficial for the processor 208 to create virtual devices that transmit stable signals during a bootstrapping walk (in order to be not excluded by the attacker as a "mobile WLAN device"). Thereafter, however, in order to counter-act the spying, some examples of the invention may then configure the processor 208 to create these 'virtual' devices to transmit variable gain or phase signals, for example in order to impersonate a 'mobile' device. That way, at least some virtual devices will be seen in their "stable phase" during the bootstrapping walk, and hence those virtual devices will be included in the list of devices from which the signals are used to calculate one or more person's movements within the area/room. Such transmit variable gain or phase signals may be created according to any one or more of the four example embodiments described later, and achieved by changing the transmit wireless local area signal amplitude and/or phase to impersonate a moving device. In some examples, the transition between "stable behaviour" versus "variable behaviour" may be achieved by keeping, for each of the virtual devices, the behaviour stable for a first period of time, and then variable for a second period of time, then again stable, and so forth.

Figure 6:
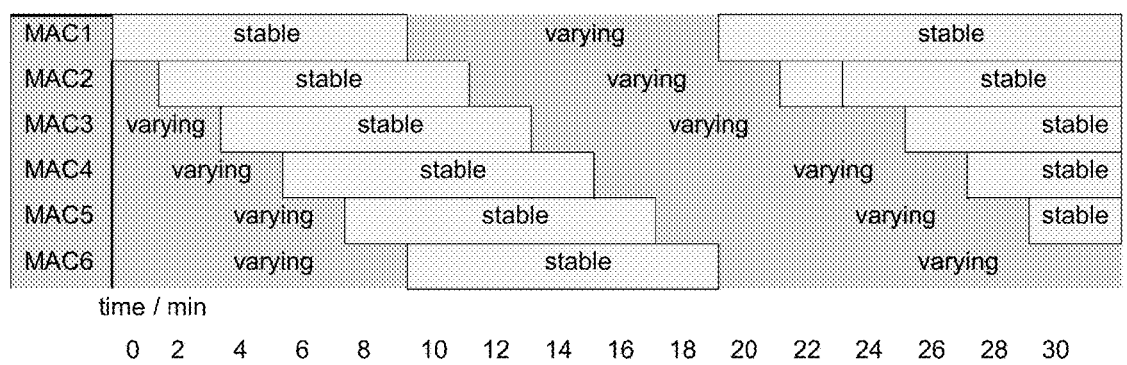
FIG. 6 illustrates a Table 1 showing stable/variable transmit pattern of virtual devices with different MAC addresses.

FIG. 6 illustrates a Table 1 showing stable/variable transmit pattern of virtual devices with different MAC addresses. Although Table 1 suggests roughly equal periods for a stable transmission and a variable gain or phase transmission, it is envisaged that, in other examples, these periods may not be roughly equal, in order to imply different time periods for a virtual device moving around the area as compared to remaining stationary within the area. For example, in accordance with some examples of the invention, the processor 208 of the wireless communication device 200 may be configured to change its 'counter-signal' behaviour according to a scheme whereby each virtual WLAN device shows a stable behaviour transmission pattern for a longer period of time, e.g. 20 minutes, then a variable gain or phase behaviour transmission pattern of, say, 1 minute. In this manner, the attacker 110 may then mark the virtual device of this MAC address as generally stationary, which then shows a dynamically changing transmission pattern to defy any potential attack, as explained in more detail in the example embodiments described later.

Typically, a transmitter is configured to transmit on all sub-channels/subcarriers of a radio air-interface with a constant transmit power. Hence, the A CSI STD value measured at the transmitter antenna should be near to zero. However, as discussed, attack scenarios are based on a variation of the A CSI STD over time. Therefore, in accordance with some examples of the invention, the processor 208 of the wireless communication device 200 may be configured to improve the disturbance capability of the wireless communication device 200 by modifying the amplitude of one or more of the transmit subcarriers, say on-the-fly. In this manner, the wireless communication device 200 increases the A CSI STD seen by the attacker by modifying the amplitude of one or more of the transmit subcarriers in a varying manner. In this context, the above-mentioned high angular directivity will then allow for increasing the A CSI STD selectively for different potential locations of the attacker around (and outside) the closed area, e.g. room.

In some examples, in the same manner as any other WLAN device, the wireless communication device 200 may be configured to transmit data packets to other WLAN devices in this area/room, such that these transmissions elicit a response, e.g., cause these receiving WLAN devices to transmit an answering message. In some examples, these answering messages create additional signals at the attacker's location. Depending on the example embodiments described below, this increase in messages can be used to disturb the signal situation seen by the attacker. It is especially advantageous for the second ('B') and fourth ('D') embodiment/use cases, as for both use cases the data traffic needs to be increased only for a short time interval.

In some examples, the wireless communication device 200 may be configured to scan the area/room, not only for signals of other WLAN devices, but also for reflectivity of walls inside the rooms, as well as potentially reflections from the walls outside of the room. In examples of the invention, this activity may be assisted by an inertial sensor 219 located inside the wireless communication device 200, in order to determine the location of stationary WLAN transmitters. The inertial sensor helps if the ASD is moved around in the closed room, in order to capture signals and create a map of transmitter locations and of reflection properties of walls etc. Using the inertial sensor 219, the wireless communication device 200 is able to precisely understand its location, at any point in time. Furthermore, in some examples, it is envisaged that the processor 208 and receiver 206 of the wireless communication device 200 may be configured to perform periodic scans of the room's reflection properties, based on, say, pulse/reflection techniques, using the high angular resolution both of the transmitter 222, 224 and the receiver of the wireless communication device 200. In this manner, the wireless communication device 200 may be able to continuously update its map of the closed area (e.g. room), using a transmit pulse and receive reflection arrangement, to disturb an attacker who is or subsequently arrived outside of the closed room.

In some examples, the processor 208 of the wireless communication device 200 may be configured to combine one or more of the above-mentioned techniques in a synergistic way, e.g. virtual devices may have different A CSI STD values, which may also vary for different transmission angles, thereby exploiting the high angular resolution of the transmit antennas. The synergistic combination of these measures may provide a better capability of defying the attacker than a plain sum of all the measurements would do. Hence, in such a synergistic combination example, the potential of the wireless communication device 200 to defy an attacker's spying shall be higher than the attacker's spying potential.

Referring now to FIG. 3, an example of a wireless communication device 300 with a receiver 206 configuration that uses multiple receive antennas 228 or a receive antenna array, in order to achieve high angular directivity and/or a transmitter 222 configuration that uses multiple transmit antennas 226 or a transmit antenna array, to achieve high angular resolution, is illustrated in accordance with some example embodiments of the invention.

In some examples, in a transmit sense, the wireless communication device 300 uses several transmit antennas 226, driven by one power amplifier 224 each. Each power amplifier 224 comprises an amplitude adjustment arrangement that is controllable by controller 214. In some instances, each power amplifier 224 also includes a phase adjustment arrangement that is controllable by controller 214 such that the phase of transmit wireless local area signals may be controlled using controllable delay lines 312 located in each of the transmit paths. In this manner, controller 214 is able to form independent narrow transmission beams of selectable orientation in order to transmit disturbing signals to an attacker.

Likewise, in some examples in a receive sense, the wireless communication device 300 uses several receive antennas 228, each coupled to a respective receive path where each receive path comprises a phase shifter 302 (say in a form of an adjustable delay line) and thereafter to a low noise amplifier 306. Each low noise amplifier 306 comprises an amplitude adjustment arrangement that is controllable by controller 214. In some instances, each low noise amplifier 306 also includes a phase adjustment arrangement that is controllable by controller 214 and/or a phase of received signals may be controlled using the controllable phase shifters 302 (say in a form of delay lines) located in each of the receive paths. In this manner, controller 214 is able to form independent narrow reception beams of selectable orientation in order to provide a good angular resolution for the received signals. The phase adjustment of the receiver(s) may be used to provide angular directivity and a narrow receive lobe for the receiver.

Thus, examples of the invention enable the wireless communication device 300 to be able to achieve a high angular directivity, both for receiving and for transmitting signals, by using multiple-in multiple-out (MIMO) techniques, employing several receive and transmit antennas, and employing variable phase shifters at the receiver and transmitter. However, unlike standard MIMO techniques, the examples in FIG. 3 are not used to increase the data rate, but to increase the angular selectivity and resolution for reception and transmission. A skilled artisan will appreciate that other techniques for increasing the angular selectivity and resolution for reception and transmission may be used, and that the concepts herein described are not limited to MIMO or MIMO-type configurations.

Figure 4:
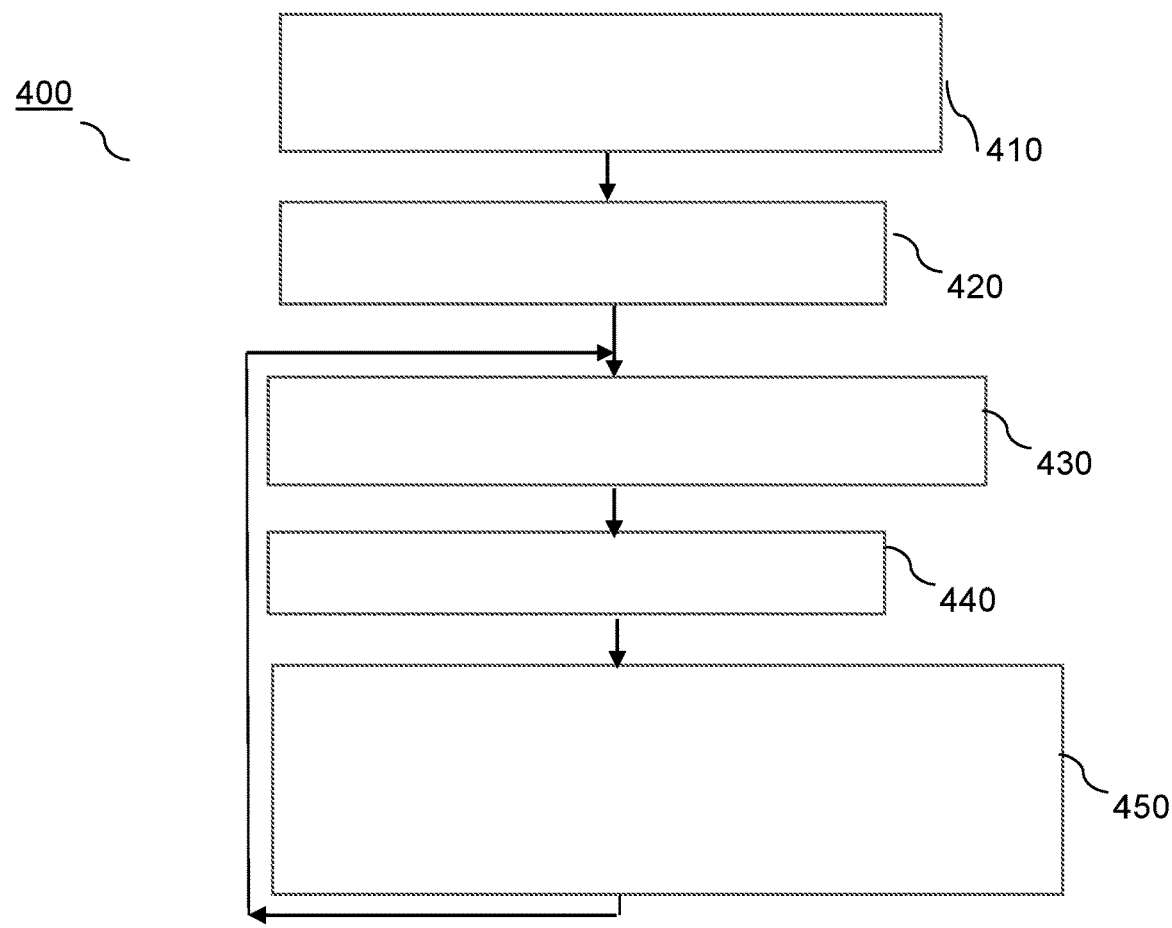
FIG. 4 illustrates an example flow chart for determining and capturing WLAN signals within a closed area (such as a room), and thereafter calculating and transmitting suitable counter-signals, according to example embodiments of the invention.

Referring now to FIG. 4, an example flowchart 400 for determining and capturing WLAN signals within an area, e.g. a room, and thereafter calculating and transmitting counter-signals, is illustrated according to example embodiments of the invention. At 410, the wireless communication device, such as wireless communication device 300 of FIG. 3, collects signal strength measurements for all WLAN transmitters within a particular area (according to their MAC address). At 420, the wireless communication device 300 creates a map of the nearby transmitters, e.g. WLAN transmitters, in a form of a table of stationary WLAN devices together with the MAC addresses of these WLAN transmitters and a particular location within the area. At 430, the wireless communication device 300 captures WLAN signals with MAC address, in a form of a standard deviation (STD) of Amplitude Channel State Information (A CSI). Based on this information, the wireless communication device 300 then creates a map/image of moving persons within the area at 440.

According to various example embodiments, at 450, the wireless communication device 300 may then implement one or more mechanism(s) to disturb an attack/confuse an attacker, such as transmit one or more counter signals, for example having a different virtual device MAC address for multiple virtual devices. In some examples of the invention, the wireless communication device 200, 300 is configured to transmit one or more signals, such that the signals seen by the attacker (i.e. signals from both other WLAN devices and wireless communication device 200, 300) restrict the attacker's ability to profile the area being spied on. In some examples of the invention, the wireless communication device 200, 300 is configured to transmit one or more signals that emulate signals transmitted by other WLAN devices both directly and signals that appear to be reflected by walls or moving persons. The ability to simulate signals that represent a combination of direct line-of-sight transmissions as well as any reflections therefrom is known by a skilled person in the art, and will not be explained further here to avoid obfuscating the inventive concepts. In some examples of the invention, the wireless communication device 200, 300, may be configured by a user of the device, for example by selecting from one or more of the following attack mitigation options:

Embodiment A

In this example, signals received from WLAN transmitters, reflected by moving persons, are overlaid by signals from the wireless communication device 200, 300. Due to the short wavelength of WLAN transmissions, (c.12 cm for WLAN 2.4 GHz transmissions), it is not possible that signals from the wireless communication device 200, 300 are able to cancel other signals (from other WLAN devices, either directly or reflected) even over a small area. Hence, the signals from the wireless communication device 200, 300 cannot reduce the A CSI STD value, but can only increase it at each attack location/at each time where it is below the maximum that is caused by a moving person. However, and advantageously, the effect of this overlaying of existing WLAN transmitter signals, by the processor 208 using signals from the wireless communication device 200, 300, is that the A CSI STD value is consistently relatively high and nearly homogeneous over location and time. This also occurs in a standard situation with highly reflecting walls, with some objects in constant motion (e.g. fans) etc. Thus, the homogenous effect of the overlaying is that the attacker considers the area as a 'room without moving people'. In this manner, the attacker mistakenly is forced to conclude that no person is moving in the room.

Embodiment B

In this example, combined signals are used by the processor 208 to make the attacker believe that people are moving in the rooms (e.g. in order to deter burglars). In this example, the wireless communication device 200, 300 is configured to mimic a person moving, not necessarily a person carrying a WLAN device like a smartphone. A moving person will reflect the signals transmitted by the WLAN devices (and notably these have a high repetition rate), whilst the signals transmitted by an IoT device carried by the person only have a low repetition rate. Thus, in some examples, it is better to mimic a person (rather than a device) in order to encourage an attacker to believe that people are moving in the room.

Here, the attacker sees a combination of signals (from WLAN transmitters and signals reflected from stationary or moving targets as well as signals from the wireless communication device 200, 300) that make the attacker believe that a person is moving in the room. Here, the processor 208 of the wireless communication device 200, 300 is configured to arrange its transmissions to create an A CSI STD value that is steadily and slowly increasing/decreasing for some time, as in a case where people actively move around in the room. Alternatively or additionally, the processor 208 of the wireless communication device 200, 300 is configured to adjust its signal transmissions (phase and/or magnitude) to simulate various levels of movement in the room. For example, the processor 208 of the wireless communication device 200, 300 is configured to create an A CSI STD value that is relatively stable and only slightly varying for some time, as in the case where people are e.g. sitting and working, hence causing a slight fluctuation in the A CSI STD value. Such a use case is similar to random-based light switches, that also mimic some internal activity and, hence, the presence of people in the room.

Embodiment C

In this example, combined signals are used to indicate unreliable movements (e.g. sudden jumps over a long distance) within a closed area, such as a room, in order to confuse a potential attacker. Thus, the attacker concludes that the received image is not reliable. In this scenario, the (combined signals) 'image' provided to the potential attacker by the processor 208 of the wireless communication device 200, 300 changes abruptly and frequently. The attacker's smartphone software will interpret this as an inconclusive situation, which doesn't allow calculating an individual person's movements inside the room. Hence, the attacker may give up on the attack.

Figure 5:
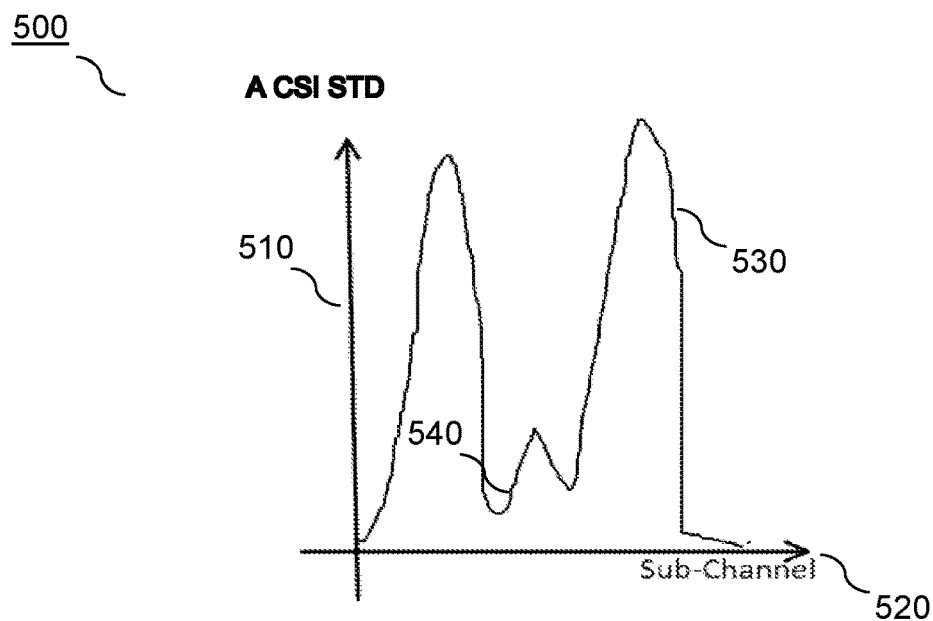
FIG. 5 illustrates an example of a graph showing A CSI STD versus sub-channel number to create counter-signals for disrupting a potential attacker, according to example embodiments of the invention.

Referring now to FIG. 5, an example of a graph 500 showing A CSI STD 510 versus sub-channel number 520 to create counter-signals for disrupting a potential attacker, according to example embodiments of the invention, is illustrated. Here, the processor 208 of the wireless communication device 200, 300 is configured to arrange its transmissions to create an A CSI STD value 530 that is very high in some sub-channels, but an A CSI STD value 540 that is very low in other sub-channels. Again, a situation that did not include the described counter-measured may be classified as unreliable by the attacker's software. Additional or alternative techniques in this vein are envisaged, for example the processor 208 of the wireless communication device 200, 300 often changing MAC addresses at the same location or arranging transmissions such that the total received signal strength is varying in a rapid manner and may be classified as unreliable by the attacker's software. Thus, in this embodiment the combined signals created by the processor 208 of the wireless communication device 200, 300 indicate unreliable movements (e.g. sudden jumps over large distances), and thus the attacker (and his smartphone software) concludes that the received signals don't allow a reliable calculation of movements inside the room.

Embodiment D

In this example embodiment, the wireless communication device may transmit wireless local area signals to encourage the attacker to move from one location to another, outside of the area (e.g. room). In this example, combined signals are used to indicate that the best location to perform the spying is a first location 'A'. Then, the attacker sees that the combined signals suggest that a second location 'B' is better to perform the spying, and so on. Advantageously, in this example, an optical or other observation of locations 'A' and 'B', and so on, may be used to reveal the attacker.

Thus, the processor 208 of the wireless communication device 200, 300 may use walls inside the room, reflections or shadowing of stationary WLAN devices that may lead to a situation that the current location of the attacker makes spying difficult, error-prone or even impossible. In such a case, the attacker's smartphone software will likely advise the attacker to continuously change the location.

Here, the processor 208 of the wireless communication device 200, 300 is configured to arrange its transmissions to create an A CSI STD value that is strongly and rapidly fluctuating. Alternatively or additionally, the processor 208 of the wireless communication device 200, 300 is configured to ensure that only signals of few WLAN devices are received by the attacker and/or that the total received signal strength is low. Alternatively, for example, the processor 208 of the wireless communication device 200, 300 may be configured to create a favourable location using a created A CSI STD value, such as one that is only slightly, and slowly fluctuating and/or where signals of many WLAN devices may be received and/or where the total received signal strength is high.

Signals generated by the processor 208 of the wireless communication device 200, 300 can be configured such that, even in the presence of a moving person, they provide the impression to the attacker that some locations are favourable, and some are very unfavourable. Modifying the signals such that first location A is favourable, but B is unfavourable, and then changing it to "A is unfavourable, B is favourable" leads the attacker to change his location from A to B and back again. A person who shows this behaviour at the times the scenario is changed, is highly suspicious of being an attacker, and might be supervised by e.g. an optical camera system.

A skilled artisan will appreciate that the level of integration of transmitter circuits, receiver circuits or components may be, in some instances, implementation-dependent. The signal processor in the transmit chain may be implemented as distinct from the signal processor in the receive chain. Alternatively, a single processor may be used to implement a processing of both transmit and receive signals, as shown in FIG. 2. Clearly, the various components within the wireless communication device 200, 300 can be realized in discrete or integrated component form, with an ultimate structure therefore being an application-specific or design selection.

Because the illustrated embodiments of the present invention may, for the most part, be implemented using electronic components and circuits known to those skilled in the art, details have not been explained in any greater extent than that considered necessary, as illustrated below, for the understanding and appreciation of the underlying concepts of the present invention and in order not to obfuscate or distract from the teachings of the present invention.

In accordance with examples of the invention, the described wireless communication device and method provides an improved ability to implement counter-measures to defy WLAN-assisted spying. Advantageously, the wireless communication device does not require any modification of existing standards, say for WLAN protocols. Advantageously, the wireless communication device does not violate any WLAN regulation or standards, e.g. on transmission power, bandwidth, time a channel can be occupied, or protocols. In examples of the invention, if a WLAN according to IEEE 802.11 is used, this relates to 'regdomain 0' in terms of the Wi-Fi certification, i.e. the 'least common denominator' settings. Advantageously, the wireless communication device will not transmit at a power level above the allowable power in any nation, nor will it use frequencies that are not permitted in any nation. In addition, the wireless communication device does not excessively use transmission time slots in order not to interfere with other WLAN devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples described herein, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired spying counter measures by operating in accordance with suitable program code, such as minicomputers, personal computers, notepads, personal digital assistants, electronic games, automotive and other embedded systems, cell phones and various other wireless devices, commonly denoted in this application as 'computer systems'. However, it is envisaged that other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A wireless communication device comprises:
   a receiver configured to receive wireless local area signals from at least one further wireless communication device located within a closed area;
   a processor coupled to the receiver and configured to:
      process the received wireless local area signals;
      calculate a standard deviation, STD, of Amplitude Channel State Information, A CSI, value of the received wireless local area signals and, in response thereto,
      generate at least one transmit wireless local area signal based on the calculated A CSI STD values; and
   a transmitter coupled to the processor and configured to transmit the at least one transmit wireless local area signal within the closed area to disrupt an attacker located adjacent the closed area from determining a location or movement of at least one of: a moving person, the at least one further wireless communication device within the closed area.

2. The wireless communication device of claim 1, wherein the processor determines a location and any movement of at least one of: a moving person, a further wireless communication device within the closed area associated with the received wireless local area signals based on the calculated A CSI STD value and generates the at least one transmit wireless local area signal according to whether the determination of the received wireless local area signals indicates a mobile transmitting device or a stationary transmitting device.

3. The wireless communication device of claim 2, further comprising a controller operably coupled to at least one of: at least one variable gain amplifier to modify an amplitude of the at least one transmit wireless local area signal, at least one phase shifter to modify a phase of the at least one transmit wireless local area signal.

4. The wireless communication device of claim 3, wherein the at least one transmit wireless local area signal uses a plurality of subcarriers and the controller modifies a signal amplitude of one or more of the plurality of subcarriers in a varying manner.

5. The wireless communication device of claim 1 preceding claim wherein the processor generates the at least one signal to exhibit an alternating characteristic, where the alternating characteristic comprises a representation of a stable behaviour of a further wireless communication device within the closed area for a first period of time and a variable gain or phase behaviour of the further wireless communication device within the closed area for a second period of time.

6. The wireless communication device of claim 1 wherein the transmitter is coupled to a plurality of antennas or an array of antennas and the processor is configured to generate a plurality of signals that mimic an operation of a plurality of further wireless communication devices, each of the plurality of signals having a different media access control, MAC, address.

7. The wireless communication device of claim 6, wherein the processor and the transmitter coupled to a plurality of transmit directional antennas varies a directivity of a transmit pulse, and the processor and the receiver coupled to a plurality of receive directional antennas obtain high angular resolution of received reflection signals within the closed area.

8. The wireless communication device of claim 1, wherein the processor, receiver and transmitter are configured to perform periodic scans for reflection properties of the closed area using a transmit pulse and a received reflection signal technique.

9. The wireless communication device of claim 1, wherein the at least one transmit wireless local area signal comprises transmit data packets configured to elicit a response from the at least one further wireless communication device located in the closed area.

10. The wireless communication device of claim 1 wherein the generated at least one signal is used by the processor to overlay existing transmitted signals by at least one further communication device in the closed area to ensure that the A CSI STD values is consistently high and exhibits a homogeneous signal characteristic over location within the closed area and across time.

11. The wireless communication device of claim 1 wherein the generated at least one signal is used by the processor to mimic a person moving within the closed area.

12. The wireless communication device of claim 1 wherein the generated at least one signal is used by the processor to combine multiple transmit wireless local area signals to indicate to an attacker unreliable movements of the at least one of: a moving person, the further wireless communication device within the closed area.

13. The wireless communication device of claim 1 wherein the generated at least one signal is used by the processor to combine signals to identify a plurality of different locations to an attacker that are suitable to perform spying of the closed room.

14. The wireless communication device of claim 1 further comprising a memory operably coupled to the receiver and the processor and configured to store calculated A CSI STD values of the received wireless local area signals and the processor is configured to access the calculated A CSI STD values from memory to generate an image of moving further communication devices within the closed area.

15. A method for a wireless communication device comprises:
   receiving wireless local area signals from at least one further wireless communication device within a closed area;
   processing the received wireless local area signals;
   calculating a standard deviation, STD, of Amplitude Channel State Information, A CSI, value of the received wireless local area signals and, in response thereto, generating at least one transmit wireless local area signal based on the calculated A CSI STD value; and transmitting the at least one transmit wireless local area signal within the closed area to disrupt an attacker located adjacent the closed area from determining a location or movement of at least one of: a moving person, the at least one further wireless communication device within the closed area.

\* \* \* \* \*